United States Patent [19]

Gray

[11] Patent Number: 5,862,337
[45] Date of Patent: Jan. 19, 1999

[54] DETERMINING THROUGHPUT DYNAMICALLY

[75] Inventor: Ronald Eric Gray, Duvall, Wash.

[73] Assignee: Microsoft Corporation, Redmond, Wash.

[21] Appl. No.: 682,831

[22] Filed: Jul. 12, 1996

[51] Int. Cl.[6] .................................................. G06F 13/00
[52] U.S. Cl. ............................ 395/200.54; 395/200.53; 395/200.62; 395/673; 395/670; 395/675; 364/551.01; 364/569; 370/229; 370/232; 370/234; 370/253; 711/113; 711/165; 711/167
[58] Field of Search ..................... 395/200.54, 200.53, 395/200.62, 185.01, 184.01, 185.07–185.08, 492, 670, 673, 675, 494; 364/551.01, 569; 370/229–236, 253, 252; 711/165, 167, 113

[56] References Cited

U.S. PATENT DOCUMENTS

| | | | |
|---|---|---|---|
| 4,429,363 | 1/1984 | Duke et al. | 395/449 |
| 4,536,836 | 8/1985 | Dodd et al. | 395/440 |
| 5,218,699 | 6/1993 | Brandle et al. | 395/650 |
| 5,247,676 | 9/1993 | Ozur et al. | 395/650 |
| 5,257,370 | 10/1993 | Letwin | 395/440 |
| 5,283,856 | 2/1994 | Gross et al. | 395/51 |
| 5,359,713 | 10/1994 | Moran et al. | 395/872 |
| 5,379,414 | 1/1995 | Adams | 395/185.08 |
| 5,519,689 | 5/1996 | Kim | 370/232 |
| 5,519,853 | 5/1996 | Moran et al. | 395/551 |
| 5,581,736 | 12/1996 | Smith | 395/497.01 |
| 5,590,366 | 12/1996 | Bryant et al. | 395/200.65 |
| 5,638,514 | 6/1997 | Yoshida et al. | 395/200.54 |
| 5,649,107 | 7/1997 | Kim et al. | 395/200.54 |

OTHER PUBLICATIONS

Shirley, John and Rosenberry, Ward, "Microsoft RPC Programming Guide", O'Reilly & Associates, 1995.

Kramer, Matt, "Baranof's MailCheck 2.6 Delivers Improved Tools", PC Week, Sep. 11, 1995, Ziff–Davis Publishing Company 1995.

Frenkel, Gary, "cc:Mail View Keeps an Eye on Your Messaging System", Network Computing, Jun. 1, 1995, CMP Publications, Inc., 1995.

*Primary Examiner*—Emanuel Todd Voeltz
*Assistant Examiner*—Tuan Q. Dam
*Attorney, Agent, or Firm*—Workman, Nydegger & Seeley

[57] ABSTRACT

Data transfers across a computer data connection are timed to measure the throughput of the connection. A counter in a computer system is updated to account for each measurement and the counter's value is checked to determine whether to allow the system's background tasks to operate.

18 Claims, 5 Drawing Sheets

DETERMINING THROUGHPUT DYNAMICALLY

BACKGROUND OF THE INVENTION

The invention is directed to computer systems and computer data connections.

Many different types of application systems can be implemented using a computer system that has a computer data connection such as a network link. One such application system is a messaging system. In a messaging system, messages directed to a user are typically stored in a mailbox that is stored on the computer system. Messaging software provides access to the mailbox to allow the user to read the messages, create replies, and otherwise manipulate the messages. The mailbox is typically made up of one or more portions of one or more computer data files.

From time to time, the user directs the messaging system to move or copy one or more messages from the mailbox to a message store that is accessible via the messaging software. For example, a typical messaging system includes a housekeeping feature that causes old messages to be deleted from a mailbox automatically. To protect important old messages in such a case, the user directs the system to move or copy these old messages from the mailbox to the message store. These old messages are then safe from the housekeeping feature and can be manipulated by the user employing the messaging software.

Like the mailbox, the message store is typically made up of one or more portions of one or more computer data files. In the usual case, the store can be located at any of the system's storage devices, including, e.g., a hard disk, a floppy disk, or a memory array. Alternatively, the store can be located across the computer data connection, which may be a network link, a dialup connection, or a wireless link.

To promote the reliability and the efficiency of the use of the store, the messaging software typically includes various maintenance features that operate automatically without input from the user, i.e., that operate in the background. One such background feature, for example, is compaction, which moves and re-organizes messages in the message store to free up useful space in the store. A background feature such as compaction that involves writing data to the store typically blocks other access to the store during the operation of the feature. Other access is blocked to protect the integrity of the store's messages, e.g., to prevent a message from being read while the message is being moved, which could cause the message to appear garbled. Thus, the user is unable to gain access to messages in the store while such a background feature is in operation.

It is desirable that the background features are minimally intrusive, i.e., that the background features cause only imperceptible delays or other interference with user-directed actions of the messaging software. If, for example, the store is located on a hard disk, the compaction feature tends to be minimally intrusive, because the high-performance nature of the hard disk allows store reorganization to occur and to conclude quickly. The high-performance of a hard disk typically includes a high data transfer rate, i.e., a high throughput, of at least many thousands of bytes per second. Thus, in the case of a hard disk, there is typically no perceptible delay if a compaction operation is in progress when the user directs the software to display one of the store's messages. In such a case, the compaction operation is quickly concluded and the message is displayed immediately.

If, on the other hand, the store is located at a floppy disk, a background feature such as compaction is usually significantly intrusive, because the typical throughput of a floppy disk is low. Thus, in the case of a floppy disk, if a compaction operation is in progress when the user directs the software to display one of the store's messages, the message is not displayed immediately. The user is able to perceive a significant delay due to the operation of the background feature.

A computer data connection such as a network link typically has a working throughput that is closer to that of a hard disk than that of a floppy disk. However, a store located across a computer data connection is also susceptible to perceptible delays from time to time. The delays occur because the connection is susceptible to problems that temporarily reduce the connection's throughput, i.e., the connection's throughput is variable. When, for example, the connection is a network link, one such problem is network traffic. Network traffic can temporarily reduce a connection's throughput to the same level as the throughput of a floppy disk. If a background feature such as compaction is in progress during this temporary reduction, the user is able to perceive significant delays.

In efforts to determine the throughput of a computer data connection, two existing methods have been used. In the first existing method, an operating system ("OS") service is used to measure the throughput at various times. The OS service causes a test string of data of a known size to be transmitted across the connection, measures the time elapsed during the transmission, and divides the known size by the time elapsed to produce a throughput value. This method is typically undesirable for frequent use in detecting temporary reductions in throughput, because the method adds to network traffic and adds delays. In addition, some connections use one or more caches, which can cause errors in the throughput measurement. A cache is a fast-access memory that performs a read-speed enhancement function by storing a copy of a subset, typically a frequently-used or most-recently-used subset, of a store of data. When data in the subset is requested from the store, the cache provides the data instead, because the cache provides faster access to the data than does the store itself. If, when the OS service is used, at least a portion of the test string is delivered from such a cache instead of across the connection, the measured throughput value is in error. The value is in error because the portion delivered from the cache did not travel across the connection. Thus, the part of the elapsed time attributable to the portion is irrelevant to the measurement of the connection's throughput. Typically, the part of the elapsed time attributable to the portion is shorter than the amount of time the portion would have taken had the portion actually travelled across the connection. Therefore, under this method, if a connection uses one or more caches, the measurement of the connection's throughput usually produces a measured throughput value that is higher than the connection's actual throughput.

In the second existing method, such an elapsed time is measured only once, when the software is first loaded and run. Unlike the first method, this method produces no further delays. In addition, this method typically avoids cache-related errors, because the cache usually delivers no portion of the string when the string is first transmitted.

However, because only one measurement is taken, this method provides no means for detecting temporary reductions in throughput.

SUMMARY OF THE INVENTION

The invention is directed to a technique for dynamically determining whether a variable-throughput data-transfer connection, such as a network link, is slow. Dynamically determining whether the connection is slow is particularly useful for reducing delays in a software program's interactions with a user. The delays are reduced by suppressing, while the connection is slow, the program's background tasks that use the connection. The invention dynamically determines whether the connection is slow by timing each instance of a data transfer initiated by the program, updating a counter for each instance, and checking the value of the counter. Preferably, in each instance, the counter is incremented unless the data transfer was slow, in which case the counter is divided by two. According to the invention, a counter so updated indicates a currently slow connection when the value of the counter is less than a threshold value.

The invention provides several advantages. A technique for dynamically determining throughput is provided that reacts quickly to drops in throughput due to, e.g., increased network traffic. In addition, the technique is minimally affected by drops in throughput that occur as a result of one-time events such as a loss of an individual packet of data on a network, a powering-up of a storage device such as a hard disk, a power surge on a network server, an initial connection delay on a remote network link such as an ISDN link, or a brief traffic-increasing fault-recovery procedure on a network.

The technique requires only a small number of steps and only a small amount of memory space. Furthermore, the technique does not require any extra data to be transferred across the link for which the throughput is being determined.

The technique also allows the operations of background tasks to be suppressed temporarily when throughput is slow. In addition, the technique is fully automatic and does not require any input from the user.

In one aspect, the invention features a method of dynamically determining whether a data transfer connection's throughput is slow, the method including timing a plurality of instances of data transfers across the connection, the instances of data transfers not being initiated for the purposes of timing; and, for each instance of the plurality, updating a cumulative record to reflect whether the data transfer was slow.

Implementations of this aspect of the invention may include one or more of the following features.

The cumulative record may be compared with a threshold reference to update a throughput indicator. The cumulative record may be updated by weighing each instance of a slow data transfer more heavily than other instances. The cumulative record may include a value and the value may be stored using a counter; and updating the cumulative record may include changing the counter by a first factor, e.g., by dividing the counter by a first whole number, if the data transfer was slow; and changing the counter by a second factor, e.g., by offsetting the counter by a second whole number, otherwise, the second factor being smaller than the first factor, the first whole number not necessarily being different from the second whole number.

The data transfer may occur in a messaging system and may be a data read operation.

A background task, e.g., a file maintenance operation, may be controlled using the throughput indicator.

The method may further include selecting the plurality of instances of data transfers at least in part by excluding a data transfer involving a cache. The data transfer may be considered slow if the data transfer occurs at approximately the data transfer rate of a floppy disk link.

The technique may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the method described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages will become apparent from the following description, including the drawings, and from the claims.

DESCRIPTION OF THE PREFERRED EMBODIMENTS

Figure 1:
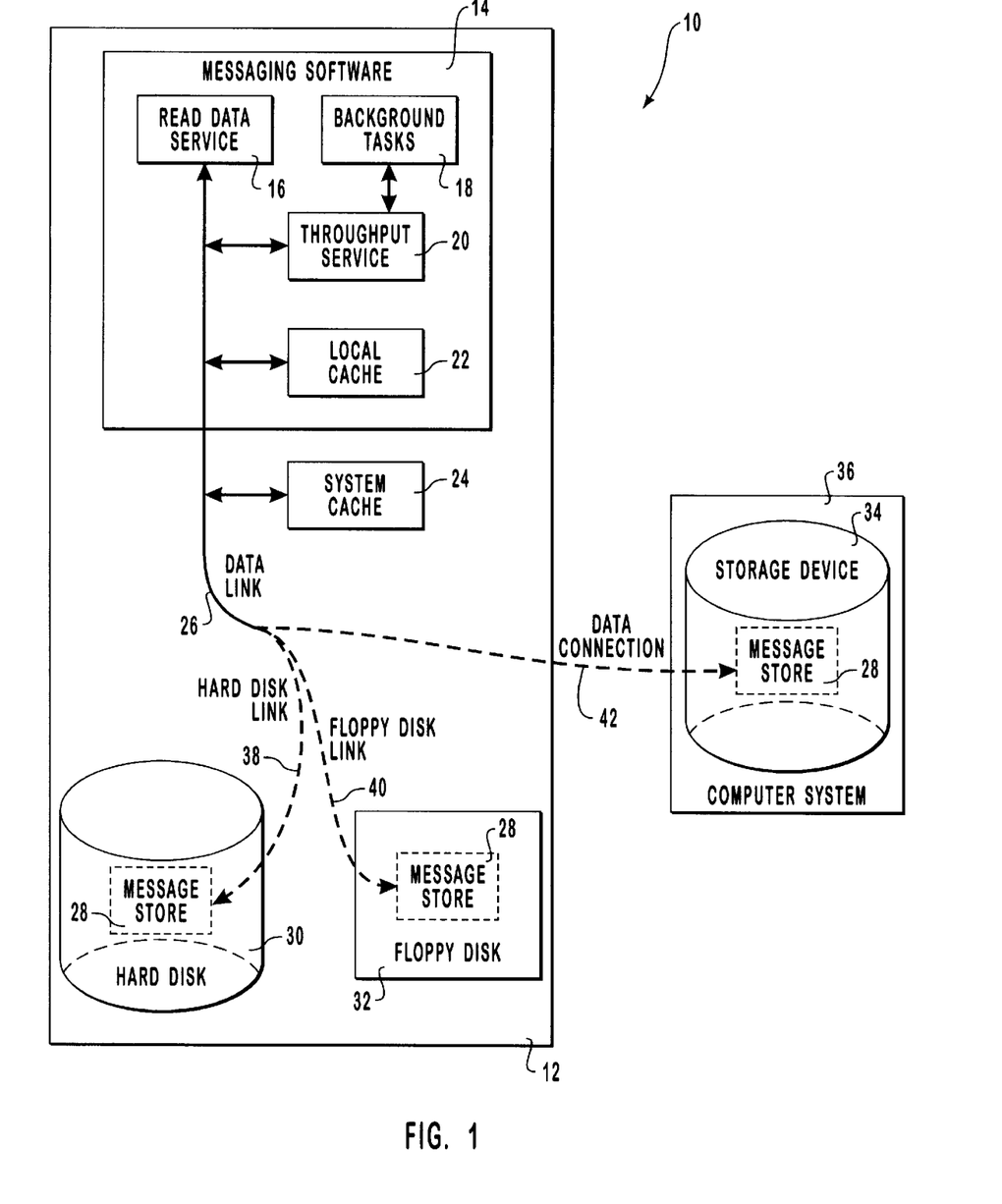
FIG. 1 is a block diagram of a computer system in a messaging system.

FIG. 1 illustrates a messaging system 10 in which a computer system 12 includes messaging software 14. The messaging software includes a "read data" service 16 that is used when the user directs the software to provide access to a message. The messaging software also includes a set 18 of background features, i.e., background tasks, which are described in more detail below. The "read data" service 16 and the background tasks 18 are linked to a throughput service 20 that is also described in more detail below. The software 14 includes a local cache 22 that stores data most recently read by the service 16. The computer system 12 provides a system cache 24 that stores data most recently read by different services, including the service 16, on the system.

The software 14 has a link 26 to a message store 28 that is located within the computer system 12 at, e.g., a hard disk 30 or a floppy disk 32, or outside the computer system at, e.g., a storage device 34 associated with another computer system 36. Thus the software's link to the store 28 is across, e.g., a hard disk link 38, a floppy disk link 40, or a computer data connection 42 such as a network link.

The background tasks 18 include a compaction service and a file-connection testing service. When the store has not been used for a particular period of time, preferably 5 minutes, the compaction service automatically initiates a re-organization of the store to provide more usable space in the store. Compaction involves, among other things, unfragmenting the placement of messages in the store and reclaiming space used by deleted messages.

The file-connection testing service is invoked when a file associated with the message store has not been used for a period of time such as several minutes. The service verifies that the file is still available for writing. The purpose of the testing service is to provide early warning of problems associated with gaining access to the file for writing. The early warning allows the software to minimize the effects of these problems.

Figure 2:
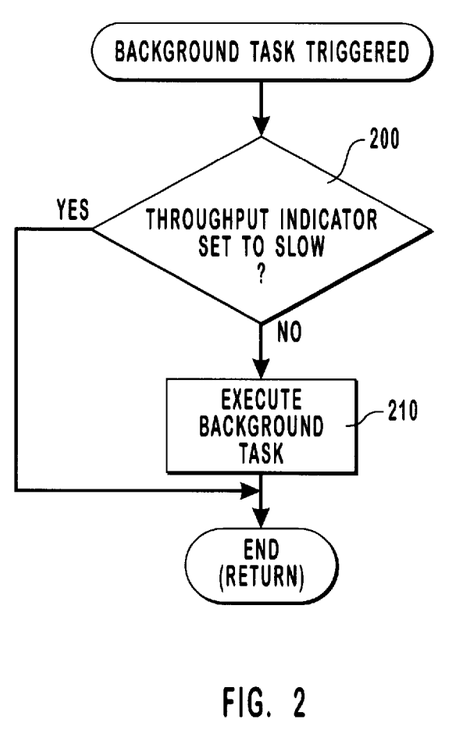
FIG. 2 is a flow chart of a procedure for using a throughput indicator to control the execution of a background task.

FIG. 2 illustrates how the background tasks make use of a throughput indicator, which is provided by the throughput service and which is described in more detail below. The background tasks use the throughput indicator to avoid executing when the messaging software's link to the message store has a slow throughput. By avoiding executing when the link is slow, the background tasks minimize their intrusiveness. With respect to FIG. 2, when a background task is triggered, the throughput indicator is checked to determine whether the throughput indicator is set to SLOW (step 200). Unless the throughput indicator is set to SLOW, the background task executes (step 210).

Preferably, the throughput indicator is set initially when the messaging software is first loaded and run. If the message store is located at a hard disk, a floppy disk, or a memory array, the link to the store is identified as a constant throughput link. The link is so identified because no significant change over time is expected in the throughput of data to and from the store at such a location. If, however, the message store is located across a computer data connection such as a network connection, the link is identified as a variable throughput link. This is because the link's throughput changes over time, depending on factors such as traffic on the link.

Figure 3:
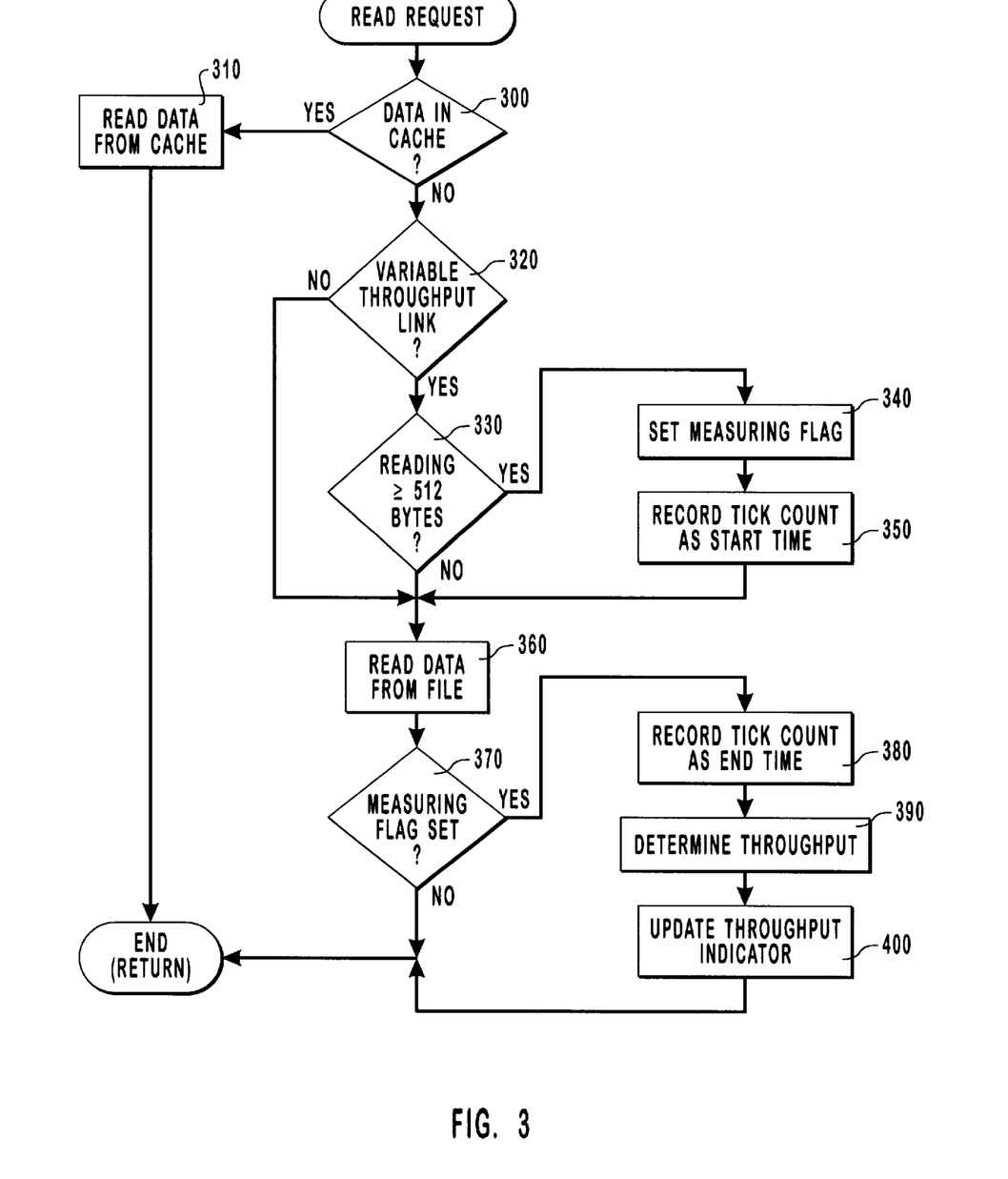
FIG. 3 is a flow chart of a procedure for measuring throughput.
Figure 4:
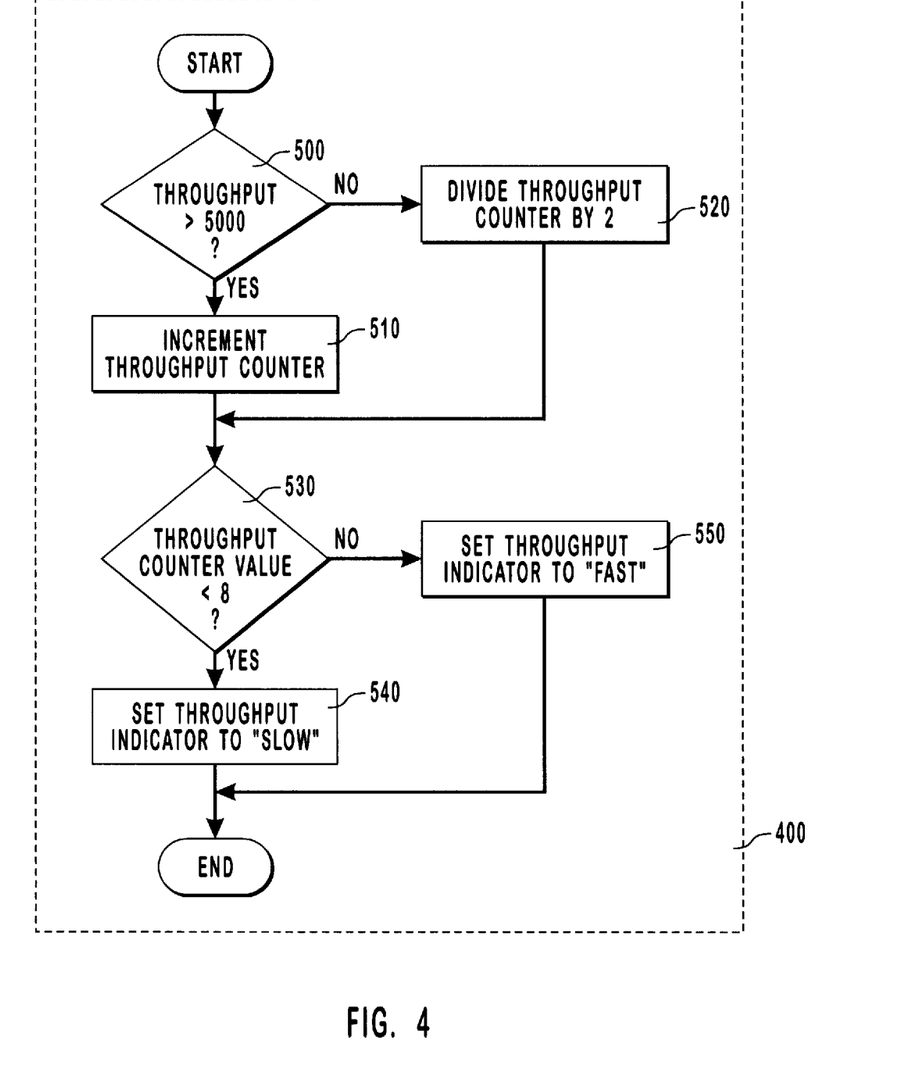
FIG. 4 is a flow chart of a procedure for updating a throughput indicator.

FIGS. 3 and 4 illustrate the preferred technique for updating the throughput indicator dynamically. The indicator is updated in the normal course of reading data from a file associated with the message store. Preferably, the indicator is not updated during writing operations, because, as discussed above, the write-data buffer interferes with the transfer of data to the store.

First, when the messaging software requests data to be read from the store, the local cache is checked to determine if the requested data can be found in the local cache (step 300). Preferably, the system cache is not checked, because the system cache is not expected to contain data from the message store that is not already in the local cache. If the requested data is found in the local cache, the requested data is, as discussed above, read from the (step 310) instead of from the store. In this case, the indicator is not updated because the link to the store is not used.

If, on the other hand, the requested data cannot be found in the local cache, the technique then determines whether the link is a variable throughput link (step 320). If the link is not a variable throughput link, updating the indicator unnecessary, because the throughput of the link does not change. Next, the technique determines whether the requested data amounts to at least 512 bytes (step 330). In a standard feature of computer systems, data is stored in groups of, e.g., 512 bytes each. As a result, at least 512 bytes are read in every read request, even if fewer than 512 bytes are requested. As described below, significant inaccuracies in the throughput calculation are avoided by updating the indicator only when read requests involving at least 512 bytes are involved.

If the requested data amounts to at least 512 bytes, a measuring flag is set to note that a throughput measurement is in progress (step 340) and a tick count of the computer system is recorded as a start time (step 350). The start time is used in the throughput calculation described below. The tick count is provided in another standard feature of computer systems that allows accurate time measurement. A clock causes the tick count to increase by one for every a standard unit of time, e.g., a millisecond, that passes. Thus, for example, if ten milliseconds pass, the tick count increases by ten.

After the start time is recorded, the requested data is read from the file (step 360). The technique then checks the measurement flag to determine whether a measurement is in progress (step 370). If so, the tick count is recorded as an end time (step 380) and the throughput for this measurement is calculated (step 390). The throughput calculation divides the amount of bytes in the requested data by the time difference corresponding to the difference between the end and start times. For example, if a millisecond count is used and the amount of bytes is 3000, a difference of 200 between the end and start times leads to a calculated throughput of 15,000 bytes per second. As mentioned above, the measurement is not executed for amounts of bytes under 512, because at least 512 bytes are always read. Therefore, for example, reading 5 bytes can be expected to take just as long as reading 512 bytes. As a result, a measurement involving only 5 bytes would lead to a calculated throughput much lower than the link's actual throughput. This difference between calculated and actual throughput would introduce a significant error that is avoided by limiting measurements to read requests involving at least 512 bytes.

Finally, the throughput indicator is updated to take into account the throughput measurement (step 400). FIG. 4 illustrates details of the updating technique, which uses a throughput counter described in more detail below. First, the technique determines whether the measured throughput is greater than a throughput threshold, e.g., 5000 bytes per second (step 500). In the preferred embodiment, a throughput of 5000 or fewer bytes per second is taken to correspond to a slow link and a throughput of greater than 5000 bytes per second is taken to correspond to a fast link. The use of 5000 bytes per second as the delineation between slow and fast links is appropriate, because a floppy disk link has a throughput of no more than 5000 bytes per second. A floppy disk link is generally considered to be a slow link. Therefore, if a variable throughput link has a throughput similar to that of a floppy disk link, the throughput of the variable throughput link is slow. However, in other embodiments, a throughput threshold other than 5000 bytes per second may be used.

If the measured throughput is greater than the throughput threshold, the throughput counter is incremented (step 510). Otherwise, the throughput counter is divided by two (step 520). Next, the technique determines whether the throughput counter is less than a counter threshold, e.g., 8 (step 530). If so, the throughput indicator is set to SLOW (step 540). Otherwise, the throughput indicator is set to FAST (step 550). The throughput counter has now been updated.

The rate of reducing the counter, by dividing by two, is faster than the rate of increasing the counter, by incrementing, to allow the updating technique to react quickly to drops in the throughput. Although other ways may be used to update the throughput counter, the technique just described is preferred, because both incrementing and dividing by two are simple and fast-executing operations in most computer systems.

As is apparent from the discussion above, the throughput counter's value at any one time reflects multiple previous throughput measurements. In the preferred embodiment, the counter threshold is 8, because the messaging software, when first loaded and run, preferably generates at least 8 read requests associated with the store. In turn, these read requests cause at least 8 throughput measurements to occur. Thus, if the link to the store is fast, the throughput counter reaches the counter threshold immediately. Reaching the counter threshold causes the throughput indicator to be set to FAST and allows the background tasks to operate as soon as the software is started. However, in other embodiments, a counter threshold other than 8 may be used.

Figure 5:
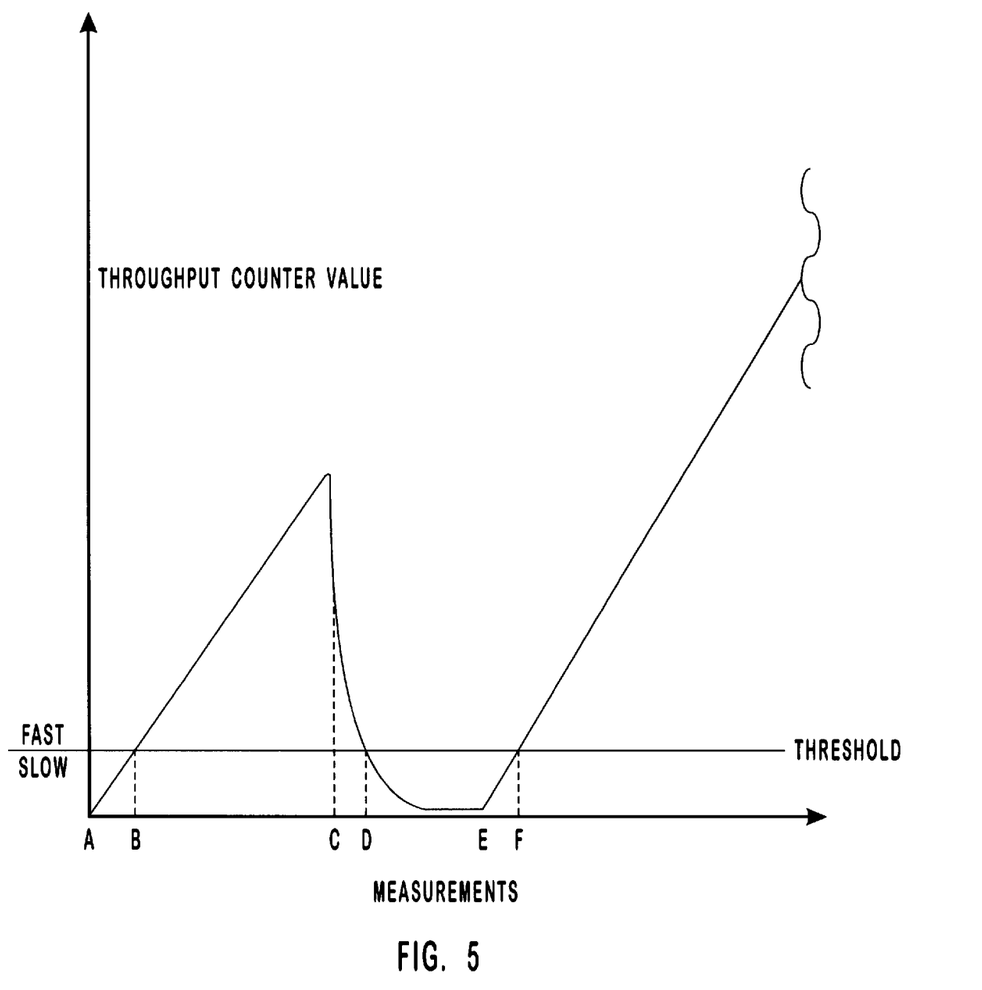
FIG. 5 is a chart of a pattern of behavior of a throughput counter.

FIG. 5, which is not necessarily to scale, illustrates an example of the throughput counter in action. At point A in the measurements, the messaging software is started. The throughput counter increases linearly and quickly reaches the threshold at point B, causing the throughput indicator to be set to FAST and allowing the background tasks to operate. After point B, the counter continues to increase, indicating that the throughput continues to be fast. At point C, the counter stops increasing and starts to drop, indicating that the throughput has become slow, perhaps due to, e.g., markedly increased network traffic. After point C, the counter drops rapidly and drops back below the threshold at point D in fewer measurements than were involved in the climb between points B and C. At point D, the throughput indicator is set to SLOW, which prevents the background tasks from operating. After point D, the counter continues to drop, indicating that the throughput is still slow. At point E, the counter starts to increase again, indicating that the throughput has become fast again, perhaps because, e.g., the network traffic has abated significantly. After point E, the counter increases until the threshold is reached again at point F, at which time the indicator returns to a setting of FAST, allowing the background tasks to function again. After point F, the counter continues to increase, at least until the next time that the throughput returns to slow.

Other embodiments are within the scope of the following claims. For example, the link need not be associated with a message store but may be associated with any type of data store. In addition, the software gaining access to the store across the link need not be messaging software but may be any software having background tasks that can be switched off temporarily to minimize intrusions.

What is claimed is:

1. In a system having at least one task that accesses data items stored in a data store via a data link as opposed to data items stored in a local cache, said data link having a variable data transfer rate that fluctuates over time, a method of dynamically determining the data transfer rate of the data link and for limiting execution of one or more background tasks based on the data transfer rate, the method comprising the steps of:

measuring the data transfer rate of a plurality of data transfers over the data link initiated for the purpose of reading data from or writing data to the data store, said data transfers not being initialed solely for the purpose of determining the throughput of the data link;

updating a throughput counter with each measured data transfer rate so that the throughput counter is represented by an accumulation of the data transfer rate measured for said plurality of data transfers; and making a determination as to whether the data transfer rate of the data link meets a designated data transfer rate criteria and based on said determination, limiting execution of one or more background tasks.

2. The method of claim 1, wherein the method further comprises:

comparing the throughput counter with a threshold reference to update a throughput indicator that indicates the transfer speed of the data link, wherein the throughput counter is updated by weighing each instance of a data transfer slower than a defined minimum more heavily than instances of a data transfer faster than the defined minimum.

3. The method of claim 1, wherein updating the throughput counter comprises:

changing the throughput counter by a first factor if the data transfer was slower than a defined minimum, and changing the throughput counter by a second factor otherwise, the second factor being smaller than the first factor.

4. The method of claim 1, wherein updating the throughput counter comprises:

dividing the throughput counter by a first whole number if the data transfer was slower than a defined minimum; and offsetting the throughput counter by a second whole number otherwise, the first whole number not necessarily being different from the second whole number.

5. The method of claim 1, wherein the data transfer occurs in a messaging system.

6. The method of claim 1, wherein the one or more background tasks comprise a file maintenance operation.

7. The method of claim 1, wherein the data transfer is a data read operation.

8. The method of claim 1, wherein the method further comprises selecting the plurality of data transfers at least in part by excluding a data transfer involving a cache.

9. The method of claim 2, wherein the defined minimum is approximately the data transfer rate of a floppy disk link.

10. In a system having at least one task that accesses data items stored in a data store via a data link as opposed to data items stored in a local cache, said data link having a variable data transfer rate that fluctuates over time an article of manufacture, comprising:

computer-readable storage medium having computer executable instructions embodied thereon, said computer executable instructions comprising:

means for measuring the data transfer rate of a plurality of data transfers over the data link initiated for the purpose of reading data from or writing data to the data store, said data transfers not being initiated solely for the purpose of determining the throughput of the data link;

means for updating a throughput counter with each measured data transfer rate so that the throughput counter is represented by an accumulation of the data transfer rate measured for said plurality of data transfers; and means for making a determination as to whether the data transfer rate of the data link meets a designated data transfer rate criteria and based on said determination, limiting execution of one or more background tasks.

11. The article of manufacture of claim 10, wherein the instructions further comprise:

means for comparing the throughput counter with a threshold reference to update a throughput indicator that indicates the transfer speed of the data link, wherein the throughput counter is updated by weighing each instance of a data transfer slower than a defined minimum more heavily than instances of a data transfer faster than a defined minimum.

12. The article of manufacture of claim 10, wherein the instructions further comprise:

means for changing the throughput counter by a first factor if the data transfer was slower than a defined minimum; and means for changing the throughput counter by a second factor otherwise, the second factor being smaller than the first factor.

13. The article of manufacture of claim 10, wherein the instructions further comprise:

means for dividing the throughput counter by a first whole number if the data transfer was slower than a defined minimum; and means for offsetting the throughput counter by a second whole number otherwise, the first whole number not necessarily being different from the second whole number.

14. The article of manufacture of claim 10, wherein the data transfer occurs in a messaging system.

15. The article of manufacture of claim 10, wherein the one or more background tasks comprise a file maintenance operation.

16. The article of manufacture of claim 10, wherein the data transfer is a data read operation.

17. The article of manufacture of claim 10, wherein the instructions further comprise means for selecting the plurality of data transfers at least in part by excluding a data transfer involving a cache.

18. The article of manufacture of claim 11, wherein the defined minimum is approximately the data transfer rate of a floppy disk link.

* * * * *

UNITED STATES PATENT AND TRADEMARK OFFICE
CERTIFICATE OF CORRECTION

PATENT NO. : 5,862,337

DATED : January 19, 1999

INVENTOR(S) : Ronald Eric Gray

It is certified that error appears in the above-identified patent and that said Letters Patent is hereby corrected as shown below:

Col.1, ln. 56: after "allows store" change "reorganization" to --re-organization--

Col. 5, ln. 56: after "read from the" insert --cache--

Col. 7, ln 64: after "not being" change "initialed" to --initiated--

Col. 8, ln 45: after "over time" insert --,--

Signed and Sealed this

Sixteenth Day of May, 2000

Attest:

Q. TODD DICKINSON

Attesting Officer      Director of Patents and Trademarks